May 19, 1931.    G. RAUSCH    1,805,706

LOAF FORMING MACHINE

Filed May 12, 1928

Inventor:
Gottfried Rausch
by [signature]
Atty.

Patented May 19, 1931

1,805,706

UNITED STATES PATENT OFFICE

GOTTFRIED RAUSCH, OF AMMENDORF, NEAR HALLE-ON-THE-SAALE, GERMANY

LOAF-FORMING MACHINE

Application filed May 12, 1928, Serial No. 277,329, and in Germany December 7, 1927.

My invention relates to loaf-forming machines and has particular reference to machines for making crescent-shaped rolls by coiling a sheet of dough, but without being limited to the manufacture of rolls, nor any other class of articles.

It is an object of my invention to provide a simpler and more readily accessible machine of this type than heretofore designed. To this end instead of providing bands or a set of rollers constituting a mould for forming the dough, I provide a machine in which the dough after having been rolled into a sheet is coiled by means of a single roller only.

With these and other objects in view, the invention consists in certain constructions and combinations which will be hereinafter fully described and then set forth in the appended claims.

In a machine of this kind the dough is readily accessible before being coiled and so is the space between that part of the sheet which has already been coiled and that which is still flat, for the entire duration of the coiling period, so that it is possible to apply to the sheet a filler which is worked into the dough while it is being coiled.

Articles of any size within the limits of the machine may be made.

The removal of the finished articles is very simple, automatic means such as a slide, a tray or the like which is preferably adjustable, being provided, if desired, for automatically ejecting the finished articles, and means may be provided preferably when articles of considerably varying size are made in the same machine, or when the dough is very delicate, for adjusting the ejector in conformity with the size of the articles. For instance a feeler may be provided which is in contact with the articles and adjusts the ejector slide or other part. Automatic ejectors increase the output of the machine and are preferred to the handling of the articles, particularly for very delicate dough.

In the drawings affixed to this specification and forming part thereof a machine embodying my invention is illustrated diagrammatically by way of example.

In the drawings

Figures 1, 2:
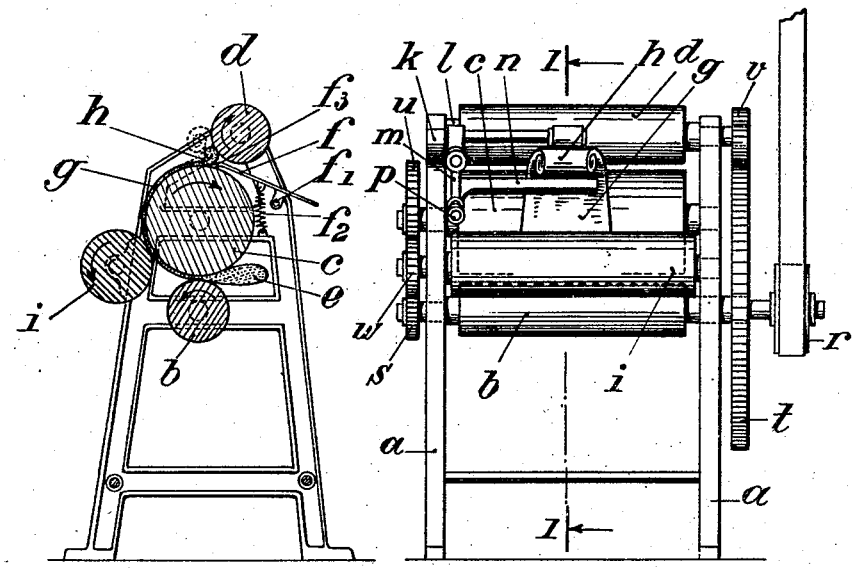
Fig. 1 is a transverse section of the machine on the line I—I in Fig. 2.
Fig. 2 is an elevation of the machine viewed from the left in Fig. 1.
Figures 3, 4:
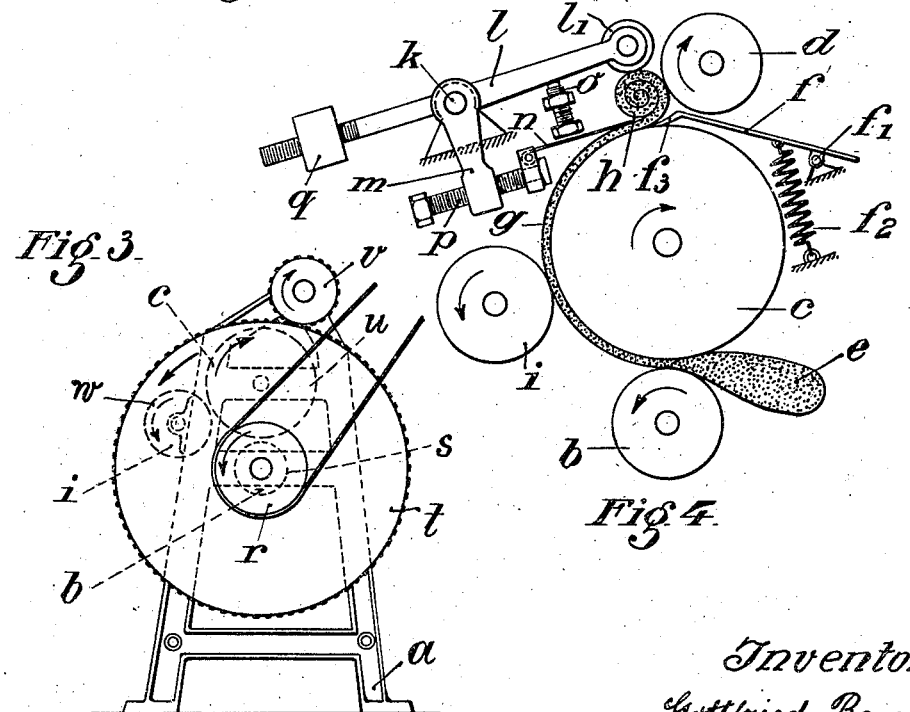
Fig. 3 is an elevation of the machine viewed from the right in Fig. 2.
Fig. 4 is a detail section showing an automatic and adjustable ejector, drawn to a larger scale.

Referring now to the drawings, and first to Figs. 1, 2 and 3, $a$, $a$ are uprights constituting the frame of the machine and $b$, $c$, $d$ and $i$ are rollers rotatably supported between the uprights $a$, rotation being imparted to the rollers by hand, or by suitable mechanical means as illustrated. $r$ is a pulley on the shaft of the roller $b$, $t$ and $s$ are a gear wheel and a pinion, respectively, on the ends of the roller shaft, $v$ is a pinion on the shaft of the roller $d$ which is meshing with the wheel $t$, $u$ is a wheel on the shaft of the roller $c$ which is meshing with the pinion $s$, and $w$ is a pinion on the shaft of the roller $i$ which is meshing with the wheel $u$. Preferably, and as shown, the roller $d$ rotates at a somewhat higher peripheral velocity, than the rollers $b$ and $c$. The directions in which the several parts of the driving mechanism are rotating are indicated by arrows in Figs. 1, 3 and 4.

The rollers $b$ and $c$ rotate in opposite directions but at substantially the same peripheral velocity, and means, not shown, are provided for adjusting them to a clearance which is equal to the size to which the sheet $g$ is rolled. A loaf $e$ is fed between the rollers $b$ and $c$ which, and particularly if it is dry on its lower and moist on its upper face, will stick to the roller $c$ and be entrained by the roller as a thin layer. The roller $i$ is preferably arranged, and particularly for elastic dough, in order to maintain constant the thickness of the sheet $g$.

$f$ is a scraper which engages the surface of the roller $c$ under the action of springs $f_2$, being pivoted at $f'$. The end $f_3$ of the scraper is preferably curved and by its curvature imparts to the dough the first coiling impulse. The sheet $g$ after having been thus deflected, strikes the roller $d$ which is at a slight distance above the scraper $f$ and rotating in the same direction as, but, as mentioned, at higher peripheral velocity than, the roller $c$. The roller $d$ coils the dough into a spiral as indicated in Fig. 4 and it will appear that the sheet $g$, and particularly the gap $h$ between the sheet and the coiled portion, is readily accessible.

$n$ is a slide for ejecting the finished articles from the machine. The slide which may engage the roller $c$ with its free end when no sheet $g$ is present in the machine, or may be held at some distance from the roller in its initial position, is adjusted by any suitable means, for instance a screw $p$, in accordance with the size of the articles.

The screw $p$ may be secured to the frame of the machine but in some cases and particularly when it is desired to manufacture articles of considerably varying size or filled articles, means are preferably provided for adjusting the slide $n$ in conformity with the size of the finished articles. To this end, as illustrated in Fig. 4, the screw $p$ may be inserted in an arm $m$ which is pivotally carried at $k$. $l$ is a feeler on the pivot $k$, $l'$ is a roller at the end of the feeler which engages the article while it is being coiled, $q$ is a balance weight on the threaded opposite end of the feeler $l$, and $o$ is an adjustable abutment for limiting the downward rocking movement of the feeler $l$.

I wish it to be understood that I do not desire to be limited to the exact details of construction shown and described, for obvious modifications will occur to a person skilled in the art.

I claim:—

1. A dough-molding machine comprising a principal roller, a sheeting roller below said principal roller, and a coiling roller above said principal roller both these latter being arranged to cooperate with said principal roller to form a sheet of dough and then arrange it in a coil, said principal roller being adapted to carry the sheet of dough from said sheeting roller toward said coiling roller, and stationary means between the principal roller and the coiling roller for detaching the sheet from said principal roller so as to deflect it toward said coiling roller.

2. A dough-molding machine comprising a principal roller, a sheeting roller, and a coiling roller both these latter being arranged to cooperate with said principal roller, said principal roller being adapted to carry a sheet of dough from said sheeting roller toward said coiling roller, a rocking frame arranged opposite said principal roller, an ejector on said frame adapted to engage the sheet on said roller, and a feeler on said frame adapted to engage the coil formed from said sheet.

3. A dough-molding machine comprising a principal roller, a sheeting roller, and a coiling roller both these latter being arranged to cooperate with said principal roller, said principal roller being adapted to carry a sheet of dough from said sheeting roller toward said coiling roller, and a rocking frame arranged opposite said principal roller, an adjustable ejector on said frame adapted to engage the sheet on said roller, and a feeler on said frame adapted to engage the coil formed from said sheet.

4. A dough-molding machine comprising a principal roller, a sheeting roller, and a coiling roller both these latter being arranged to cooperate with said principal roller, said principal roller being adapted to carry a sheet of dough from said sheeting roller toward said coiling roller, a rocking frame arranged opposite said principal roller, an adjustable ejector on said frame adapted to engage the sheet on said roller, a feeler on said frame adapted to engage the coil formed from said sheet, and a balance weight arranged opposite said feeler.

5. A dough rolling machine comprising in combination a principal roller, dough sheet coiling means cooperating with the upper side of said principal roller, and dough sheeting means spaced therefrom along the periphery of said roller and co-acting therewith to form a sheet of dough on said roller for movement toward said coiling means.

6. A dough rolling machine comprising in combination a principal roller, dough sheet coiling means cooperating with the upper side of said principal roller, and dough sheeting means spaced therefrom along the periphery of said roller and co-acting therewith to form a sheet of dough on said roller for movement toward said coiling means, said sheeting means including a sheet sizing roller cooperating with said principal roller.

7. A dough rolling machine comprising in combination a principal roller, dough sheet coiling means cooperating with the upper side of said principal roller, and dough sheeting means spaced therefrom along the periphery of said roller for applying a sheet of dough to said roller for movement toward said coiling means, said sheeting means being positioned under said roller to expose the area between the side and top of the principal roller, thereby to facilitate applying filler material to the sheet.

8. A dough rolling machine comprising in combination a principal roller, dough sheet coiling means cooperating with the upper side of said principal roller, and dough sheeting means spaced therefrom along the periphery of said roller for applying a sheet of dough to said roller for movement toward said coiling means, said sheeting means being positioned under said roller and arranged to receive dough lumps from the opposite side of the roller from that carrying the sheet.

9. A dough rolling machine comprising in combination a principal roller, dough sheet coiling means cooperating with the upper side of said principal roller, and dough sheeting means spaced therefrom along the periphery of said roller for applying a sheet of dough to said roller for movement toward said coiling means, said coiling means being positioned near the top of said principal roller to aid in ejecting completed dough rolls through gravity.

10. A dough rolling machine comprising in combination a principal roller, dough sheet coiling means cooperating with the upper side of said principal roller, and dough sheeting means spaced therefrom along the periphery of said roller and co-acting therewith to form a sheet of dough on said roller for movement toward said coiling means, and an ejector arranged to act on completed rolls formed by said coiling means.

11. A dough rolling machine comprising in combination a principal roller, dough sheet coiling means cooperating with the upper side of said principal roller, and dough sheeting means spaced therefrom along the periphery of said roller for applying a sheet of dough to said roller for movement toward said coiling means, and an ejector arranged to act on completed rolls formed by said coiling means, and a dough roll engaging feeler controlling the operation of said ejector.

12. A dough rolling machine comprising in combination a principal roller, dough sheet coiling means cooperating with said principal roller, dough sheeting means spaced from said coiling means along the periphery of said principal roller arranged to apply a sheet of dough to said principal roller for movement to said coiling means, said coiling means comprising a single driven roller and a station deflecting element for directing the sheet diametrically against said roller.

13. A dough rolling machine comprising in combination a principal roller, dough sheet coiling means cooperating with said principal roller, and dough sheeting means spaced from said coiling means along the periphery of said principal roller arranged to apply a sheet of dough to said principal roller for movement to said coiling means, said sheeting means including a single roller disposed below said principal roller and cooperating therewith to form lumps of dough into sheets on said principal roller.

14. A dough rolling machine comprising in combination a principal roller, dough sheet coiling means cooperating with said principal roller, dough sheeting means arranged below said principal roller to form a sheet of dough on said principal roller for movement to said coiling means at a point substantially one-half the circumference of the principal roller from said coiling means to expose a large area of said sheet for auxiliary operations thereon.

In testimony whereof I affix my signature.

GOTTFRIED RAUSCH.